(12) United States Patent
Chou et al.

(10) Patent No.: US 9,377,163 B2
(45) Date of Patent: Jun. 28, 2016

(54) METHOD OF MANUFACTURING A HYDROGEN STORAGE DEVICE

(71) Applicant: Cheng Uei Precision Industry Co., Ltd, New Taipei (TW)

(72) Inventors: Cheng Yu Chou, New Taipei (TW); Che Wei Hsu, New Taipei (TW); Chih Wei Cheng, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 504 days.

(21) Appl. No.: 13/891,727

(22) Filed: May 10, 2013

(65) Prior Publication Data

US 2014/0334961 A1 Nov. 13, 2014

(51) Int. Cl.
| | |
|---|---|
| *B22F 7/02* | (2006.01) |
| *F17C 11/00* | (2006.01) |
| *B22F 7/00* | (2006.01) |
| *C01B 3/00* | (2006.01) |
| *B22F 3/22* | (2006.01) |

(52) U.S. Cl.
CPC ............... *F17C 11/005* (2013.01); *B22F 3/225* (2013.01); *B22F 7/004* (2013.01); *C01B 3/0031* (2013.01); *C01B 3/0078* (2013.01); *C01B 3/0084* (2013.01); *B22F 2998/10* (2013.01); *Y02E 60/321* (2013.01); *Y02E 60/327* (2013.01)

(58) Field of Classification Search
None
See application file for complete search history.

(56) References Cited

U.S. PATENT DOCUMENTS

| | | | | | |
|---|---|---|---|---|---|
| 4,360,569 | A | * | 11/1982 | Steyert | B22F 1/0003 419/2 |
| 5,443,616 | A | * | 8/1995 | Congdon | B22F 1/0003 419/2 |
| 6,015,041 | A | * | 1/2000 | Heung | C01B 3/0005 206/70 |
| 7,237,428 | B2 | * | 7/2007 | DaCosta | C01B 3/0005 206/0.7 |
| 7,404,842 | B1 | * | 7/2008 | Wainright | B22F 9/04 420/900 |

FOREIGN PATENT DOCUMENTS

WO 2005-088211 * 9/2015

* cited by examiner

*Primary Examiner* — George Wyszomierski
*Assistant Examiner* — Ngoclan T Mai
(74) *Attorney, Agent, or Firm* — Mucny, Geissler, Olds & Lowe, P.C.

(57) ABSTRACT

A method of manufacturing a hydrogen storage device includes the steps: (1) mix metal powder, backbone binder and wetting agent to make a canister shell feedstock; (2) mix metal powder, salts, backbone binder and wetting agent to make a porous structure feedstock; (3) feed the canister shell feedstock in an injection molding machine to form a green part of canister shell; (4) feed the porous structure feedstock in the green part of canister shell to form a green part of porous structure integral with the green part of canister shell by injection molding; (5) dissolve the salts out of the green part of porous structure to form pores; (6) remove the wetting agent from the green parts of canister shell and porous structure; (7) remove the backbone binder from the green parts of canister shell and porous structure to form the hydrogen storage device.

10 Claims, 4 Drawing Sheets

US 9,377,163 B2

METHOD OF MANUFACTURING A HYDROGEN STORAGE DEVICE

BACKGROUND OF THE INVENTION

1. Field of the Invention

The present invention relates to a manufacturing method, and more particularly to a method of manufacturing a hydrogen storage device.

2. The Related Art

A hydrogen storage alloy cans, in terms of use, in addition to hydrogen absorption and desorption properties, hydrogen storage capacity, operating temperature and pressure being acted as the basic considerations, mobility and thermal conductivity of the alloy powder affecting hydrogen absorption and desorption rate of the hydrogen storage alloy cans, and volume expansion in the process of hydrogen absorption affecting the safety of the hydrogen storage alloy cans must be paid attention too.

A conventional hydrogen storage device generally use metal sheet to construct a cellular which is mounted to a longitudinal axis. Then hydrogen storage alloy powder is filled within the cellular to form the hydrogen storage device which achieves a larger reaction surface area, disperses expansion stress in the process of hydrogen absorption and desorption, and increases thermal conductivity.

However, the conventional hydrogen storage device has a complex internal structure and an external structure opened with channels and openings. After the internal structure is structured, a welding procedure is done at the channels and the openings of the external structure. So that results in a cumbersome process of manufacturing the hydrogen storage device. Moreover, on account of the changes of heat affected zone and internal precipitation phase, an effect of hydrogen embrittlement is apt to happen at the welds in the stress cycle of high pressure hydrogen, so that easily causes weld cracking and hydrogen embrittlement corrosion and results in a poor life and safety of the hydrogen storage device. So, a method of manufacturing a hydrogen storage device capable of overcoming the foregoing problems is required.

SUMMARY OF THE INVENTION

Accordingly, an object of the present invention is to provide a method of manufacturing a hydrogen storage device. The method includes the following steps:

(1) mix metal powder, backbone binder and wetting agent to make a canister shell feedstock;
(2) mix metal powder, salts, backbone binder and wetting agent to make a porous structure feedstock;
(3) feed the canister shell feedstock in an injection molding machine to form a green part of canister shell by injection molding;
(4) put the green part of canister shell in the injection molding machine, then feed the porous structure feedstock in the green part of canister shell to form a green part of porous structure integral with the green part of canister shell by injection molding;
(5) put the green parts of canister shell and porous structure in water to dissolve the salts out of the green part of porous structure so as to form interconnected pores;
(6) remove the wetting agent from the green parts of canister shell and porous structure; and
(7) remove the backbone binder from the green parts of canister shell and porous structure without the salts and the wetting agent through sintering at high temperature, to make the metal powder densification so as to form the hydrogen storage device.

As described above, the method of manufacturing the hydrogen storage device of the present invention utilizes the steps of feeding the canister shell feedstock in the injection molding machine to form the green part of canister shell by injection molding, and then feeding the porous structure feedstock in the green part of canister shell to form the green part of porous structure integral with the green part of canister shell by injection molding, to realize a seamless joint process of the hydrogen storage device, so that can effectively avoid weld cracking and hydrogen embrittlement corrosion so as to improve the safety of the hydrogen storage device. Furthermore, the hydrogen storage device can effectively reduce the thickness of walls thereof by means of the method of manufacturing the present invention.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
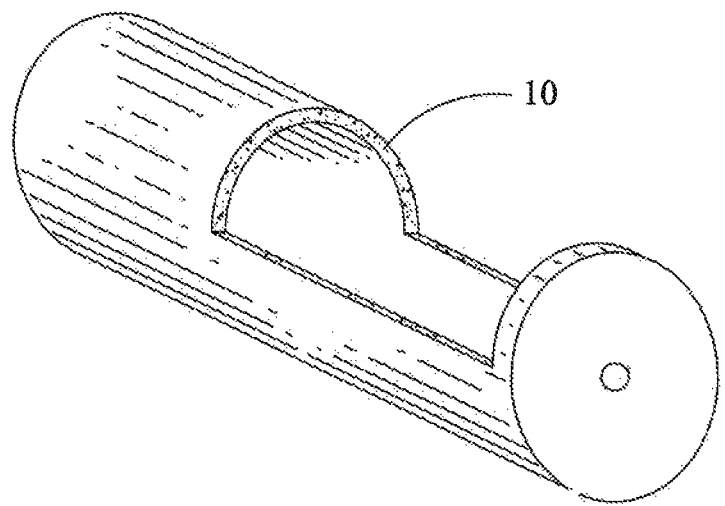
FIG. 1 is a partially sectioned perspective view of a green part of canister shell in accordance with an embodiment of the present invention.
Figure 2:
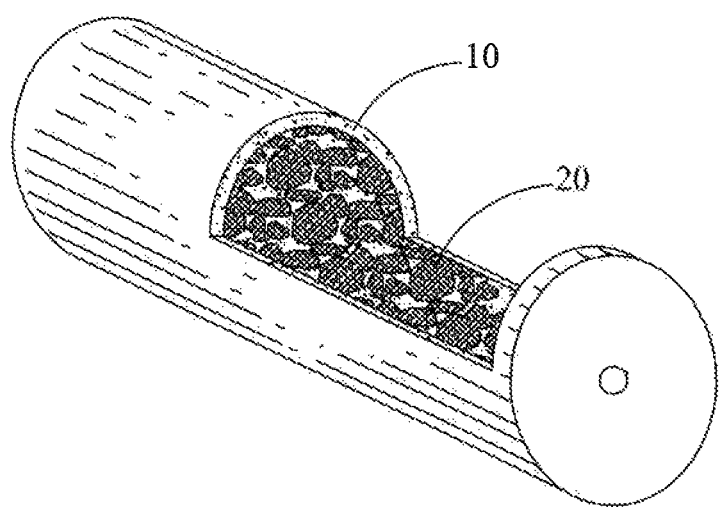
FIG. 2 is a partially sectioned perspective view of a green part of porous structure integral with the green part of canister shell of FIG. 1 in accordance with an embodiment of the present invention.
Figure 3:
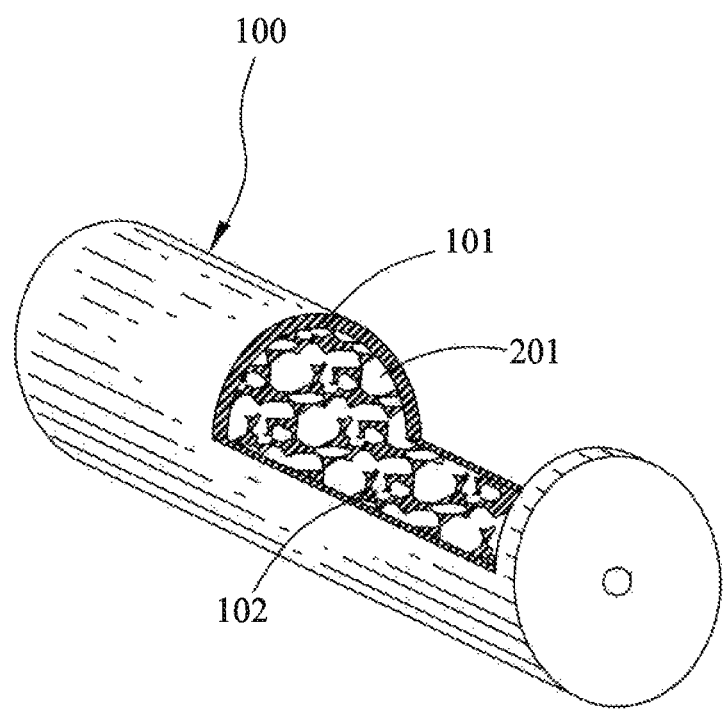
FIG. 3 is a partially sectioned perspective view of a hydrogen storage device in accordance with an embodiment of the present invention.
Figure 4:
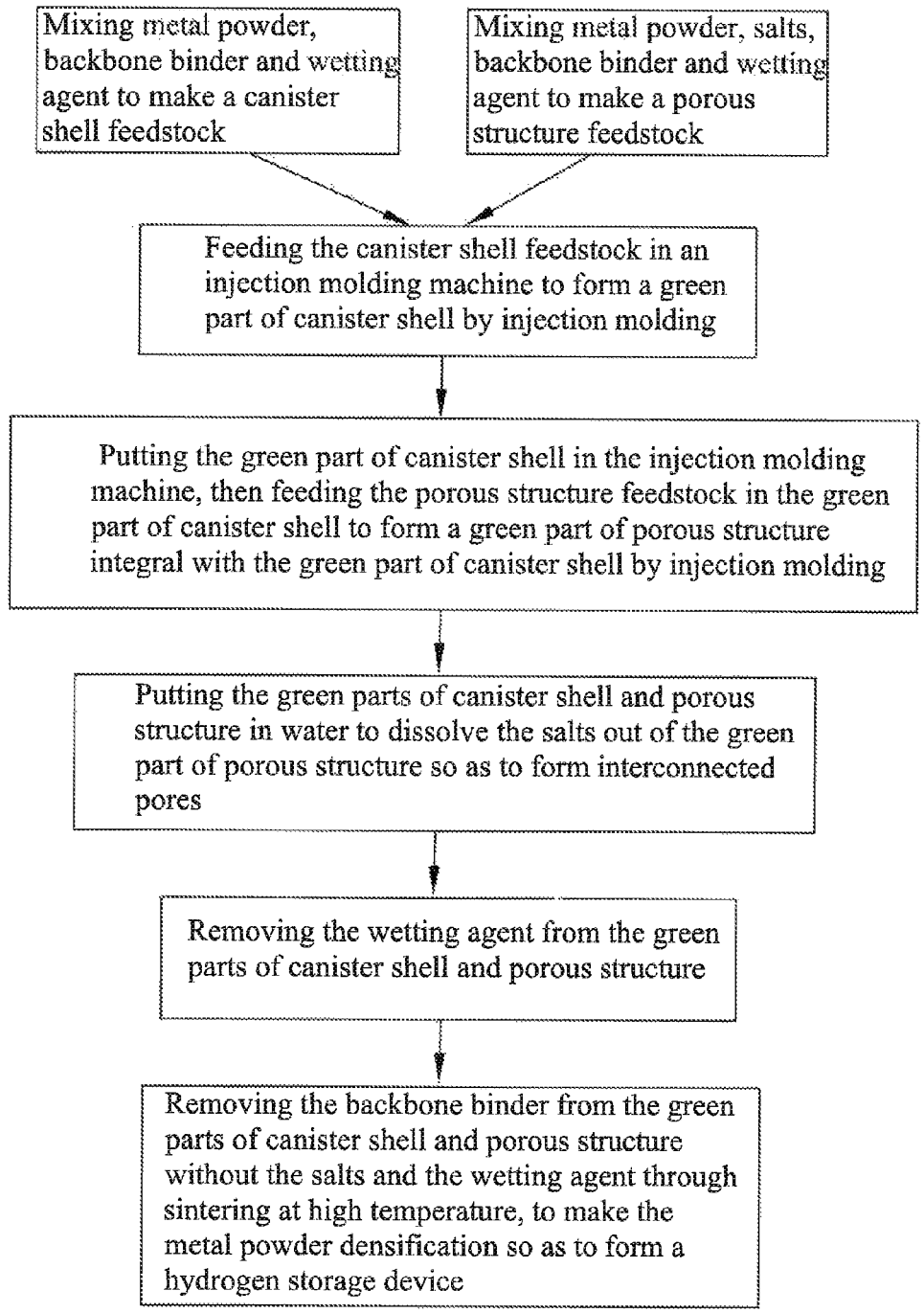
FIG. 4 is a schematic flow diagram of a method of manufacturing the hydrogen storage device shown in FIG. 3.

Referring to FIGS. 1-4, a method of manufacturing a hydrogen storage device 100 according to the present invention includes the following steps.

(1) Mix metal powder, backbone binder and wetting agent to make a canister shell feedstock.

(2) Mix metal powder, salts, backbone binder and wetting agent to make a porous structure feedstock.

(3) Feed the canister shell feedstock in an injection molding machine to form a green part of canister shell 10 by injection molding.

(4) Put the green part of canister shell 10 in the injection molding machine, then feed the porous structure feedstock in the green part of canister shell 10 to form a green part of porous structure 20 integral with the green part of canister shell 10 by injection molding.

(5) Put the green part of canister shell 10 and the green part of porous structure 20 in water to dissolve the salts out of the green part of porous structure 20 so as to form interconnected pores 201. Porosity and size of the pores 201 can be adjusted by changing the volume percentage of the salts in the porous structure feedstock. The greater the volume percentage of the salts is in the porous structure feedstock, the better the quantity of the pores 201 will be, and the easier it can form the pores 201 which are interconnected. The less the volume percentage of the salts is contained in the porous structure feedstock, the worse the quantity of the pores 201 will be.

(6) Remove the wetting agent from the green part of canister 10 and the green part of porous structure 20.

(7) Remove the backbone binder from the green part of canister shell 10 and the green part of porous structure 20 without the salts and the wetting agent through sintering at high temperature, to make the metal powder densification so as to form the hydrogen storage device 100 which has the canister shell 101 and the porous structure 102 integral with each other.

In step (1), for the canister shell feedstock, the metal powder has a volume percentage of 50% to 70%. The metal powder can be stainless steel or metal alloy, and the metal alloy can be copper alloy. In this embodiment, the metal powder is preferably stainless steel. The total volume percentage of the backbone hinder and the wetting agent is 30% to 50% in the canister shell feedstock, wherein the backbone binder in the backbone binder and the wetting agent has a volume percentage of 10% to 90%. The backbone binder is mainly plastics for improving the strength of the canister shell 101 after the green part of canister shell 10 is sintered (the green part of canister shell 10 refers to a pre-product molded in the injection molding machine and without being processed through sintering at high temperature). The wetting agent can be wax, polyacetal (POM) or water-based materials (water-soluble materials) etc. for increasing the fluidity of the backbone binder in order to facilitate the completion of the injection molding. Through using the canister shell feedstock, the canister shell 101 is solid with the densification of more than 95% after the green part of canister shell 10 is sintered.

In step (2), for the porous structure feedstock, the metal powder can be metal or metal alloy, the metal can be copper, aluminum or titanium, and the metal alloy can be copper alloy. The total volume percentage of the metal powder and the salts is 50% to 70% in the porous structure feedstock, and the salts in the metal powder and the salts has a volume percentage of 20% to 80%. The total volume percentage of the backbone binder and the wetting agent is 30% to 50% in the porous structure feedstock. The backbone binder is mainly plastics. The salts is water-soluble salts that can be NaCl, KCl, MgCl2 and so on. The wetting agent can be wax, polyacetal (POM) or water-based materials (water-soluble materials) for increasing the fluidity of the backbone binder in order to facilitate the completion of the injection molding.

In step (6), when the wetting agent in the green part of canister shell 10 and the green part of porous structure 20 is wax, the wax-based material is removed by cleaning with solvent or heating the green part of canister shell 10 and the green part of porous structure 20, wherein the solvent can be one of n-butane, n-octane, cleaning naphtha and bromopropane. When the wetting agent in the green part of canister shell 10 and the green part of porous structure 20 is water-based material, the water-based material is removed by soaking the green part of canister shell 10 and the green part of porous structure 20 in water. When the wetting agent in the green part of canister shell 10 and the green part of porous structure 20 is polyacetal, the polyacetal is removed from the green part of canister shell 10 and the green part of porous structure 20 by cracking with nitric acid gas.

Because the main ingredient in the porous structure feedstock is the metal powder, after the salts, the wetting agent and the backbone binder are removed out of the green part of porous structure 20, the inner faces of the porous structure 102 are exposed with a large area of metal material so that achieves a higher thermal conductivity of the porous structure 102 and further improves the efficiency of hydrogen absorption and desorption.

As described above, the method of manufacturing the hydrogen storage device 100 of the present invention utilizes the steps of feeding the canister shell feedstock in the injection molding machine to form the green part of canister shell 10 by injection molding, and then feeding the porous structure feedstock in the green part of canister shell 10 to form the green part of porous structure 20 integral with the green part of canister shell 10 by injection molding, to realize a seamless joint process of the hydrogen storage device 100, so that can effectively avoid weld cracking and hydrogen embrittlement corrosion so as to improve the safety of the hydrogen storage device 100. Furthermore, the hydrogen storage device 100 can effectively reduce the thickness of walls thereof by means of the method of manufacturing the present invention.

The foregoing description of the present invention has been presented for the purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A method of manufacturing a hydrogen storage device, comprising the following steps:
    (1) mixing metal powder, backbone binder and wetting agent to make a canister shell feedstock;
    (2) mixing the metal powder, salts, the backbone binder and the wetting agent to make a porous structure feedstock;
    (3) feeding the canister shell feedstock in an injection molding machine to form a green part of canister shell by injection molding;
    (4) putting the green part of canister shell in the injection molding machine, then feeding the porous structure feedstock in the green part of canister shell to form a green part of porous structure integral with the green part of canister shell by injection molding;
    (5) putting the green parts of canister shell and porous structure in water to dissolve the salts out of the green part of porous structure so as to form interconnected pores;
    (6) removing the wetting agent from the green parts of canister shell and porous structure; and
    (7) removing the backbone binder from the green parts of canister shell and porous structure without the salts and the wetting agent through sintering at high temperature, to make the metal powder densified so as to form the hydrogen storage device.

2. The method as claimed in claim 1, wherein the metal powder in the canister shell feedstock has a volume percentage of 50% to 70%, the total volume percentage of the backbone binder and the wetting agent is 30% to 50% in the canister shell feedstock, the backbone binder in the backbone binder and the wetting agent has a volume percentage of 10% to 90%.

3. The method as claimed in claim 1, wherein in the canister shell feedstock, the metal powder is stainless steel or metal alloy, the metal alloy is copper alloy, the backbone binder is mainly plastics, the wetting agent is wax, polyacetal or water-based materials.

4. The method as claimed in claim 1, wherein the total volume percentage of the metal powder and the salts is 50% to 70% in the porous structure feedstock, the salts in the metal powder and the salts has a volume percentage of 20% to 80%, the total volume percentage of the backbone binder and the wetting agent is 30% to 50% in the porous structure feedstock.

5. The method as claimed in claim 1, wherein in the porous structure feedstock, the metal powder is metal or metal alloy, the metal is copper, aluminum or titanium, the metal alloy is copper alloy, and the backbone binder is mainly plastics, the salts is water-soluble salts, the wetting agent is wax, polyacetal or water-based materials.

6. The method as claimed in claim 1, wherein in step (5), porosity and size of the pores are adjusted by changing the volume percentage of the salts in the porous structure feedstock.

7. The method as claimed in claim 1, wherein in step (6), the wetting agent in the green part of canister shell and the green part of porous structure is wax-based material, the wax-based material is removed by cleaning with solvent or heating the green parts of canister shell and porous structure.

8. The method as claimed in claim 7, wherein the solvent is one of n-butane, n-octane, cleaning naphtha and bromopropane.

9. The method as claimed in claim 1, wherein in step (6), the wetting agent in the green part of canister shell and the green part of porous structure is water-based material, the water-based material is removed by soaking the green parts of canister shell and porous structure in water.

10. The method as claimed in claim 1, wherein in step (6), the wetting agent in the green part of canister shell and the green part of porous structure is polyacetal, the polyacetal is removed from the green parts of canister shell and porous structure by cracking with nitric acid gas.

\* \* \* \* \*